(12) United States Patent
Klomsdorf et al.

(10) Patent No.: US 8,706,061 B2
(45) Date of Patent: Apr. 22, 2014

(54) METHOD FOR SIMULTANEOUS TRANSMITTER OPERATION

(75) Inventors: Armin W. Klomsdorf, Chicago, IL (US); Gregory R. Black, Vernon Hills, IL (US); Ryan J. Goedken, Lake Zurich, IL (US)

(73) Assignee: Motorola Mobility LLC, Libertyville, IL (US)

( * ) Notice: Subject to any disclaimer, the term of this patent is extended or adjusted under 35 U.S.C. 154(b) by 42 days.

(21) Appl. No.: 13/586,993

(22) Filed: Aug. 16, 2012

(65) Prior Publication Data
US 2014/0051373 A1    Feb. 20, 2014

(51) Int. Cl.
*H04B 1/04*    (2006.01)

(52) U.S. Cl.
CPC .................................. *H04B 1/0475* (2013.01)
USPC ................... 455/114.2; 455/67.13; 455/296; 455/114.3; 455/553.1

(58) Field of Classification Search
USPC .......... 455/63.1, 67.11, 67.13, 68, 69, 114.2, 455/114.3, 115.1, 226.1, 296
See application file for complete search history.

(56) References Cited

U.S. PATENT DOCUMENTS

| | | |
|---|---|---|
| 6,009,129 A | 12/1999 | Kenney et al. |
| 6,281,748 B1 | 8/2001 | Klomsdorf et al. |
| 6,310,788 B1 * | 10/2001 | Myer .............................. 363/39 |
| 6,320,461 B1 * | 11/2001 | Lee ................................. 330/52 |
| 6,937,094 B2 * | 8/2005 | Khanifar et al. ............... 330/129 |
| 7,020,487 B2 * | 3/2006 | Kimata ....................... 455/556.1 |
| 2004/0192232 A1 | 9/2004 | Szopko et al. |
| 2009/0318087 A1 * | 12/2009 | Mattila et al. ................. 455/63.1 |
| 2011/0222444 A1 * | 9/2011 | Khlat et al. .................... 370/277 |
| 2012/0184327 A1 * | 7/2012 | Love et al. ................. 455/552.1 |
| 2013/0044621 A1 * | 2/2013 | Jung et al. ..................... 370/252 |

* cited by examiner

*Primary Examiner* — Duc M Nguyen (57) ABSTRACT

A method and system mitigates receiver desensitization caused by a reverse inter-modulation distortion (IMD) signal generated by a power amplifier associated with one of at least two concurrently operating transmitters. A power amplifier controller (PAC) determines whether at least one power amplifier operating in a first operating state generates a reverse IMD signal that can substantially interfere with at least one receive channel due to a concurrent operation of at least two concurrently operating transmitters. In response to determining that at least one power amplifier generates the reverse IMD signal when in the first operating state, the PAC initiates a second operating state of the power amplifier to increase the linearity of the at least one power amplifier in order to reduce the reverse IMD signal. The PAC initiates the second operating state by adjusting parameters of the power amplifier.

20 Claims, 6 Drawing Sheets

| Voice Channel (freq) | Data Channel (freq) | Voice Channel Tx Power level (units of signal power) | Data Channel Tx Power level (units of signal power) | PA1 operating state, parameter values (in units associated with a respective parameter) | PA2 operating state, parameter values (in units associated with a respective parameter) | Mode and 3rd order reverse IMD (dBm) |
|---|---|---|---|---|---|---|
| f1 | f2 | p units | r units | State 3: parameter1=value1; parameter2=value2; parameter3=value3 | State 2: parameter1=value1; parameter2=value3; parameter3=value3 | Mode:1 IMD1=A IMD2=B |
| f1 | f3 | r units | s units | State 2: parameter1=value1; parameter2=value2; parameter3=value3 | State 2: parameter1=value1; parameter2=value2; parameter3=value3 | Mode:2 IMD1=B IMD2=B |
| f2 | f3 | s units | s units | State 3: parameter1=value1; parameter2=value3; parameter3=value3 | State 2: parameter1=value1; parameter2=value2; parameter3=value3 | Mode:3 IMD1=B IMD2=A |
| ...... | ...... | ...... | ...... | ...... | ...... | ...... |

METHOD FOR SIMULTANEOUS TRANSMITTER OPERATION

BACKGROUND

1. Technical Field

The present disclosure relates in general to wireless communication devices and in particular to interference reduction in wireless communication devices.

2. Description of the Related Art

The ability to provide simultaneous voice and data communication service is a requirement for many network operators providing multiple types of transmission services. For example, Simultaneous Voice and Long Term Evolution (SVLTE) data transmission comprising Code Division Multiple Access (CDMA) 1X voice and LTE data transmission is a requirement for many CDMA/LTE operators. For intra-band SVLTE or simultaneous voice and data (SVDO), odd order reverse inter-modulation distortion (IMD) products generated by the power amplifier (PA) can cause desensitization to one or more receivers. The level of desensitization may be too high to be managed effectively using maximum output power reduction. A same issue is encountered during LTE uplink (UL) carrier aggregation.

Current approaches focus on mitigating IMD without addressing reverse IMD. In particular, the current approaches all relate to adjusting PA linearity to optimize current drain while still meeting transmitter specifications. These approaches do not attempt to mitigate reverse IMD, nor do they address dual transmit configurations which are required for SVLTE, SVDO, and UL carrier aggregation.

The conventional approach for dealing with SVLTE desensitization is to add extremely large ceramic filters. These ceramic filters increase insertion loss, degrade current drain and receiver sensitivity even when SVLTE is not being used. These filters do not help with intraband SVLTE, SVDO or intra-band carrier aggregation, since the two transmitters are operating in the same band. The use of isolators is another conventional approach for addressing SVDO desensitization. However, isolators increase insertion loss even when SVLTE/SVDO is not active and provide only a small and inadequate level of improvement.

BRIEF DESCRIPTION OF THE DRAWINGS

The described embodiments are to be read in conjunction with the accompanying drawings, wherein.

DETAILED DESCRIPTION

The illustrative embodiments provide a method and system for mitigating receiver desensitization caused by a reverse inter-modulation distortion (IMD) signal generated by a power amplifier associated with one of at least two concurrently operating transmitters in a wireless communication device. A power amplifier controller (PAC) determines whether at least one power amplifier operating in a first operating state generates a reverse inter-modulation distortion (IMD) signal that can substantially interfere with at least one receive channel due to a concurrent operation of at least two concurrently operating transmitters. In response to determining that at least one power amplifier generates the reverse IMD signal when in the first operating state, the PAC initiates a second operating state of the power amplifier to trigger an increase in linearity of the at least one power amplifier in order to reduce the reverse IMD signal on at least one receive channel. The PAC initiates the second operating state by adjusting at least one of (a) a power amplifier bias, (b) a power amplifier supply voltage and/or (c) a power amplifier load match.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof.

Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Figure 1:
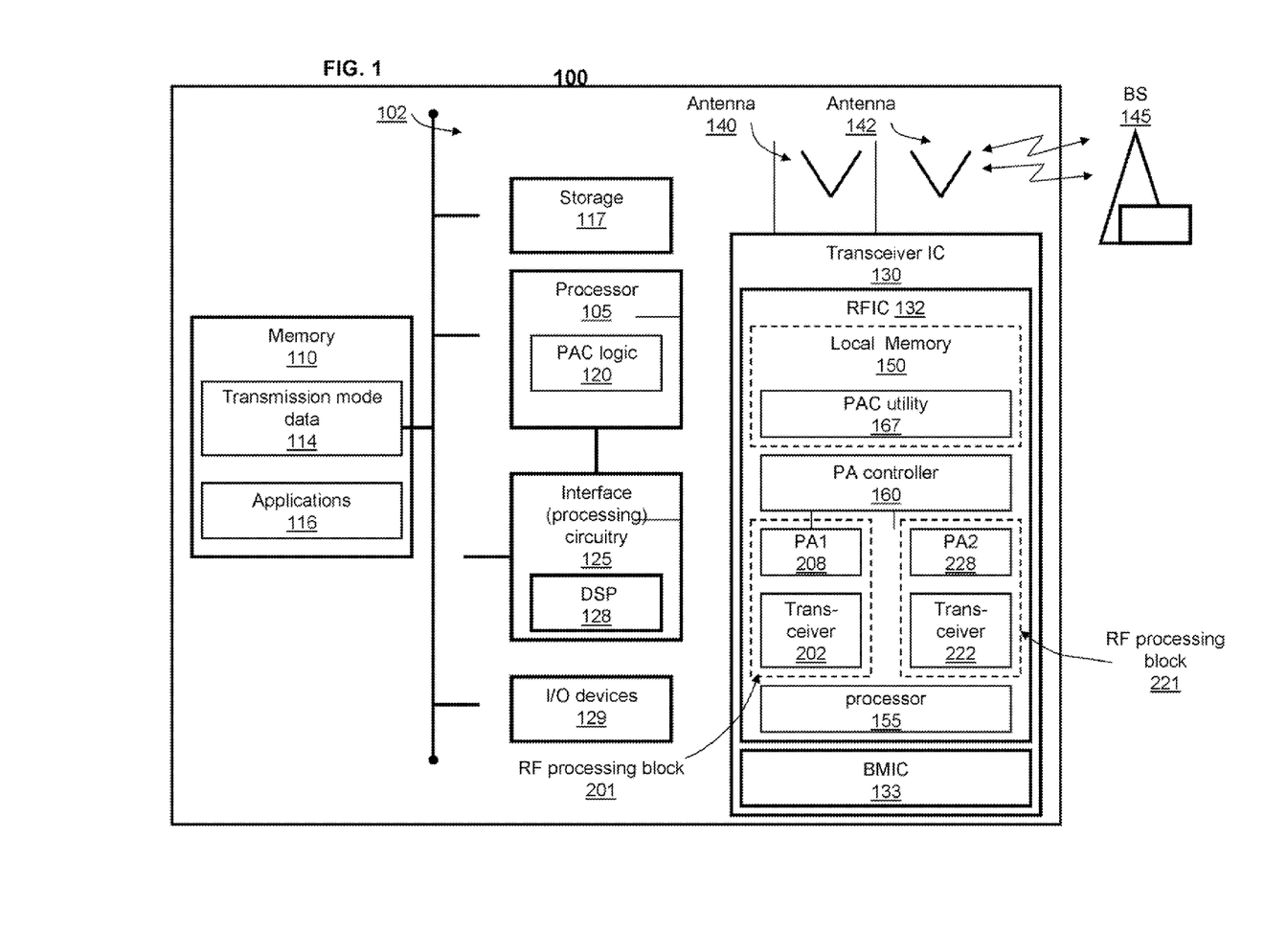
FIG. 1 is a block diagram illustrating an example wireless communication device within which the various features of the described embodiments can be advantageously implemented, according to one embodiment.

With specific reference now to FIG. 1, there is depicted a block diagram of an example wireless communication device 100, within which the functional aspects of the described embodiments may be implemented. Wireless communication device 100 represents a device that is adapted to transmit and receive electromagnetic signals over an air interface via uplink and/or downlink channels between the wireless communication device 100 and communication network equipment (e.g., base-station 145) utilizing a plurality of different communication standards including Global System for Mobile Communications (GSM), Code Division Multiple Access (CDMA) and Orthogonal Frequency Division Multiple Access (OFDMA) and similar systems. In one or more embodiments, the wireless communication device can be a mobile cellular device/phone or smartphone, or laptop, netbook or tablet computing device, or other types of communications devices. Wireless communication device 100 comprises processor 105 and interface circuitry 125, which includes digital signal processor (DSP) 128. Processor 105 and interface circuitry 125 are connected to memory component 110 via signal bus 102. Wireless communication device 100 includes a transceiver integrated circuit 130 for sending and receiving communication signals. In at least some embodiments, the sending and receiving of communication signals occur wirelessly and are facilitated by one or more antennas 140 and 142 coupled to the transceiver IC 130. The number of antennas can vary from device to device, ranging from a single antenna to two or more antennas, and the presentation within wireless communication device 100 of two antennas is merely for illustration.

Wireless communication device 100 is able to wirelessly communicate to base-station 145 via antenna 140 and antenna 142. Base station 145 can be any one of a number of different types of network stations and/or antennas associated with the infrastructure of the wireless network, and configured to support uplink and downlink communication via one or more of the wireless communication protocols, as known by those skilled in the art.

Transceiver IC 130 comprises baseband modem integrated circuit (BMIC) 133 and radio frequency integrated circuit (RFIC) 132. RFIC 132 comprises a memory or storage system 150, power amplifier controller 160 and RF processing blocks 201 and 221. RF processing block 201 comprises power amplifier 208, transceiver 202 and other processing block components (not shown). Similarly, RF processing block 221 comprises power amplifier 228, transceiver 222 and other processing block components shown in FIG. 2. In one implementation, power amplifier controller 160 is coupled to both power amplifiers 208 and 228. In one embodiment, RFIC 132 also includes a local processor 155, which can be described as a digital signal processor (DSP). According to one aspect of the disclosure, the memory/storage system includes therein firmware, such as Power Amplifier Controller (PAC) utility 167, which supports the various processing functions of RFIC 132. The structural makeup of RFIC 132 is described in greater detail in FIG. 2.

In addition to the above described hardware components of wireless communication device 100, various features of the invention may be completed/supported via software (or firmware) code and/or logic stored within memory 110 or local memory 150 of RFIC 132 and respectively executed by DSP 128, Processor 105, or a local processor 155 of RFIC 132.

Thus, for example, illustrated within local memory 150 are a number of software/firmware/logic components/modules, including PAC utility 167.

The various components within wireless communication device 100 can be electrically and/or communicatively coupled together as illustrated in FIG. 1. As utilized herein, the term "communicatively coupled" means that information signals are transmissible through various interconnections between the components. The interconnections between the components can be direct interconnections that include conductive transmission media, or may be indirect interconnections that include one or more intermediate electrical components. Although certain direct interconnections are illustrated in FIG. 1, it is to be understood that more, fewer or different interconnections may be present in other embodiments.

Aspects of the described embodiments are described with reference to the term intermodulation distortion (IMD). As provided herein, IMD is the result of two or more signals interacting in a non-linear device to produce additional unwanted signals. These additional signals referred to as IMD products occur mainly in devices such as amplifiers and mixers. Two interacting signals will produce IMD products at the sum and difference of integer multiples of the original frequencies "f1" and "f2". For two input signals, the output frequency components can be expressed as: $mf1 \pm nf2$ where, "m" and "n" are integers. The order of the IMD product is the sum of the integers "m" and "n". The "two tone" third order components, ($2*f1-f2$ and $2*f2-f1$), are particularly important because unlike $2^{nd}$ order distortion (i.e., harmonic distortion at $2*f1$ or $2*f2$), these third order components can occur at frequencies close to the expected f1 and f2 signals and, as a result, cannot be easily filtered. The IMD products often fall in the channel of a co-located receiver.

Figure 2:
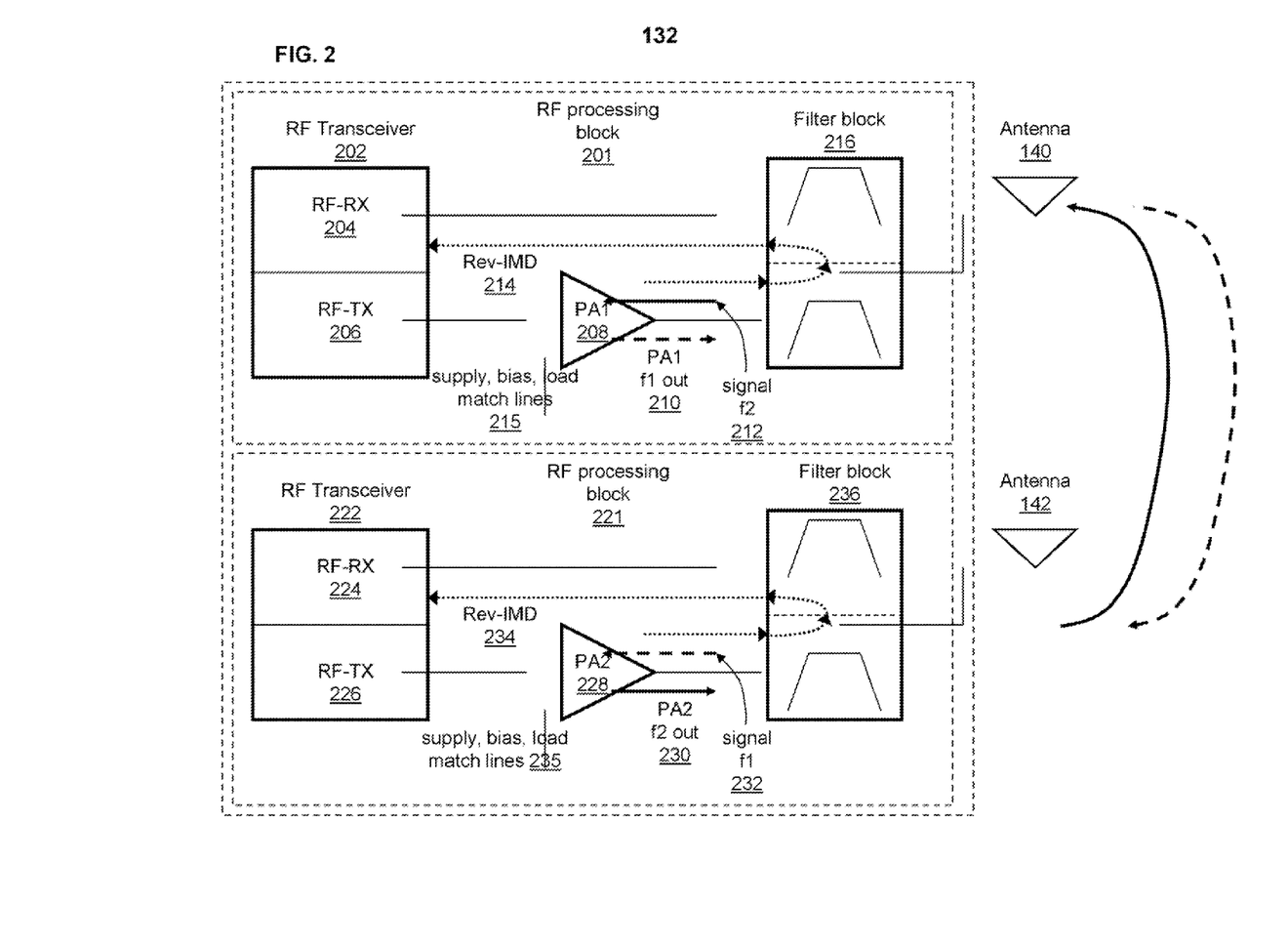
FIG. 2 provides a block diagram representation of a radio frequency integrated circuit (RFIC), according to one embodiment.

FIG. 2 provides a block diagram representation of a radio frequency integrated circuit (RFIC), according to one embodiment. RFIC 132 comprises first radio frequency (RF) processing block 201 and second RF processing block 221 each co-located within relative close proximity of the other RF processing block. First RF processing block 201 comprises first RF transceiver 202, which includes first RF receiver 204 and first RF transmitter 206. First RF processing block 201 also comprises filter block 216. Antenna 140 is connected by filter block 216 to first RF processing block 201.

First RF receiver 204 is coupled to an output port of filter block 216. First RF processing block 201 also comprises first power amplifier 208 which is coupled to an output port of first RF transmitter 206 and to an input port of filter block 216. First power amplifier 208 yields a first power amplifier output signal propagated via a first carrier frequency f1, which first power amplifier output signal is illustrated as PA1 f1 out 210. First power amplifier 208 is coupled by a number of signal lines to power amplifier controller 160. The signal lines that couple power amplifier controller 160 to first power amplifier 208 include a power supply line, a power amplifier bias line and a load match line, which are collectively illustrated as "supply, bias, and load match lines" 215. In one implementation, supply, bias, and load match lines 215 represents supply line 314, bias line 312, and load match line 316 shown in FIG. 3. Similarly, second power amplifier 228 is coupled by a number of signal lines to power amplifier controller 160. The signal lines that couple power amplifier controller 160 to second power amplifier 228 are collectively illustrated as "supply, bias, and load match lines" 235. In one implementation, supply, bias, and load match lines 235 represents supply line 320, bias line 318, and load match line 322 shown in FIG. 3. Also illustrated within first RF processing block 201 is an interfering signal illustrated as f2 signal 212. F2 signal 212 is an interfering signal corresponding to a second power amplifier output signal generated within second RF processing block 221 and propagated via a second carrier frequency f2. As illustrated, f2 signal 212 couples into or enters an output port of first power amplifier 208. Also shown within first processing block 201 is first reverse intermodulation distortion signal illustrated as Rev-IMD 214.

Second RF processing block 221 comprises second RF transceiver 222 which includes second RF receiver 224 and second RF transmitter 226. Second RF processing block 221 also comprises filter block 236. Antenna 142 is connected by filter block 236 to second RF processing block 221. Second RF receiver 224 is coupled to an output port of filter block 236. Second RF processing block 221 also comprises second power amplifier 228 which is coupled to an output port of second RF transmitter 226 and to an input port of filter block 236. Second power amplifier 228 yields a second power amplifier output signal propagated via a second carrier frequency f2 which output signal is illustrated as PA2 f2 out 230. Also illustrated within second RF processing block 221 is interfering signal 230 illustrated as f1 signal 232. F1 signal 232 is an interfering signal corresponding to a first power amplifier output signal generated within first RF processing block 201 and propagated via the first carrier frequency f1. As illustrated, f1 signal 232 couples into or enters an output port of second power amplifier 228. Also shown within second processing block 221 is second reverse intermodulation distortion signal illustrated as Rev-IMD 234.

Power amplifier controller 160 (FIG. 1) controls the operating states of power amplifiers 208 and 228 in order to minimize reverse IMD associated with at least one of the power amplifiers. Power amplifier controller 160 is described in greater detail in FIG. 3. In addition, reverse IMD feedback measurement component 335 is described within the description of FIG. 3.

Figure 3:
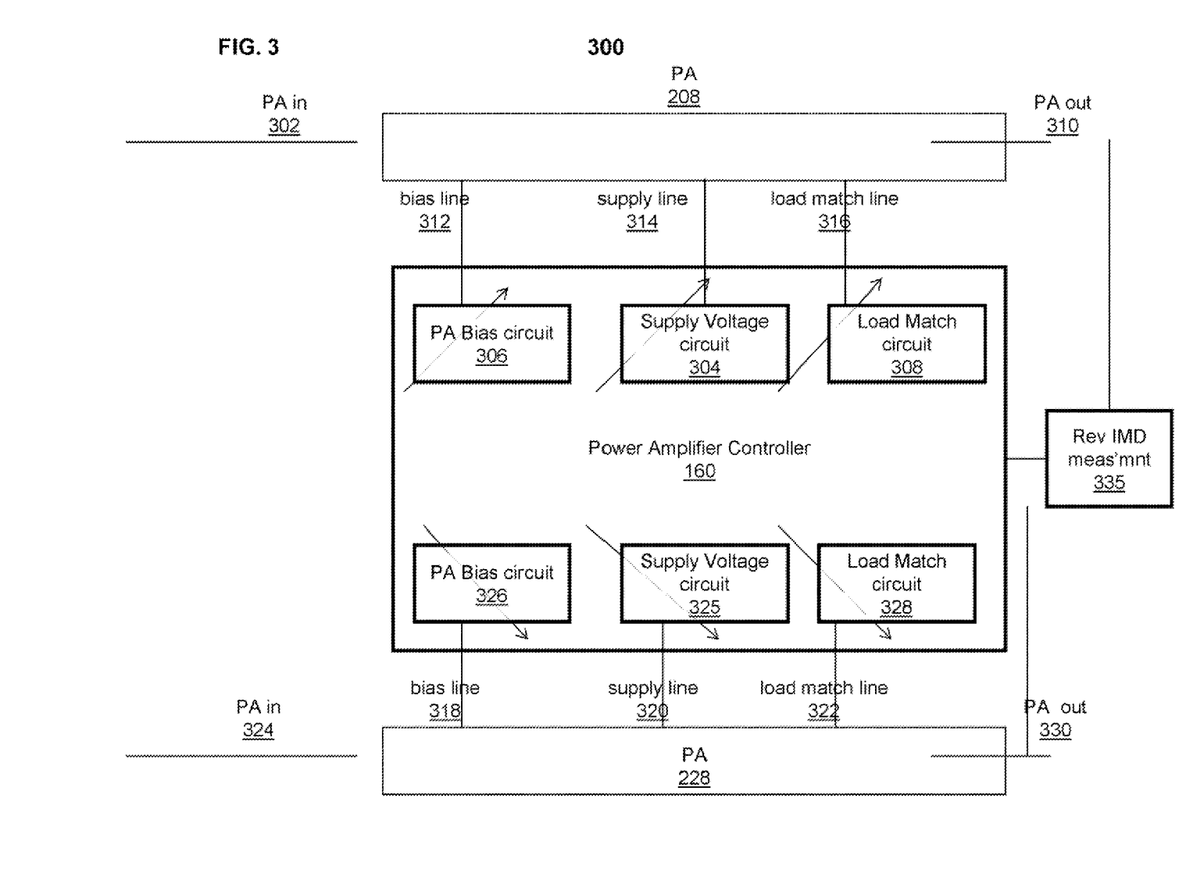
FIG. 3 is a block diagram illustrating a power amplifier controller coupled to two power amplifiers, according to one embodiment.

FIG. 3 is a block diagram illustrating an embodiment of an amplifier control circuit comprising a power amplifier controller coupled to two power amplifiers 208, 228. Amplifier control circuit 300 comprises power amplifier controller 160. In addition, amplifier control circuit 300 comprises first power amplifier 208 and second power amplifier 228, which are both coupled to power amplifier controller 160. Included within amplifier control circuit 300 are a first input line and a first output line of first power amplifier 208 illustrated as PA In 302 and PA Out 310, respectively. In addition, amplifier control circuit 300 includes second input line and second output line of second power amplifier 228 illustrated as PA In 324 and PA Out 330, respectively. Also illustrated in amplifier control circuit 300 is reverse IMD measurement module 335 coupled to power amplifier controller 160. Reverse IMD measurement module 335 is also coupled to PA Out 310 and PA Out 330, respectively.

Included within power amplifier controller 160 is first power amplifier variable supply voltage circuit 304, first power amplifier variable bias circuit 306, and first power amplifier variable load match circuit 308. First power amplifier variable supply voltage circuit 304 is coupled by first supply voltage line 314 to first power amplifier 208. First power amplifier variable bias circuit 306 is coupled by first voltage bias line 312 to first power amplifier 208. First power amplifier variable load match circuit 308 is coupled by first load match line 316 to first power amplifier 208. Power amplifier controller 160 also comprises second power amplifier variable supply voltage circuit 325, second power amplifier variable bias circuit 326 and second power amplifier variable load match circuit 328. Second power amplifier variable supply voltage circuit 325 is coupled by second supply voltage line 320 to second power amplifier 228. Second power amplifier variable bias circuit 326 is coupled by second voltage bias line 318 to second power amplifier 228. Second power amplifier variable load match circuit 328 is coupled by second load match line 322 to second power amplifier 228. Although the variable circuit components comprising power amplifier variable supply voltage circuits, power amplifier variable bias circuits, and power amplifier variable load match circuits are illustrated as components within power amplifier controller 160, in one implementation, these variable circuit components are separate from and external to power amplifier controller 160.

Power Amplifier controller 160 (FIGS. 1 and 3) determines whether a first power amplifier operating in a first operating state generates a reverse inter-modulation distortion (IMD) signal that can substantially interfere with at least one receive channel from among a first receive channel and a second receive channel due to a concurrent operation within the RFIC of multiple transmitters. If multiple transmitters operate concurrently while the first power amplifier operates in the first operating state, the first power amplifier generates the reverse inter-modulation distortion (IMD) signal in response to an interfering signal such as f2 signal 212 coupling into an output port of first power amplifier 208 and combining with a desired signal being processed by first power amplifier 208. As a result, first power amplifier 208 generates first reverse intermodulation distortion signal illustrated as Rev-IMD 214 (FIG. 2). In this case, power amplifier controller 160 processes feedback measurements of reverse IMD associated with the first operating state in order to minimize an impact of reverse IMD. In a first embodiment, using information about operating parameters stored within RFIC 132, first power amplifier 208 switches from a first operating state to a second operating state to reduce receiver desensitization caused by reverse IMD associated with the first operating state. In the first embodiment, power amplifier controller 160 switches to the second, preferred operating state, using feedback of reverse IMD, to minimize a level of generated reverse IMD associated with the first operating state. In a second embodiment, using information about operating parameters stored within RFIC 132, first power amplifier 208 initiates transmitter operation in the second operating state to avoid a receiver desensitization caused by reverse IMD associated with the first or other operating state. Thus, in the second embodiment, concurrent operation of multiple transmitters including first power amplifier 208 can begin with first power amplifier 208 functioning in the second operating state.

In the second embodiment, power amplifier controller 160 selects the preferred operating state, using transmission mode configuration data 114 stored in RFIC 132, in order to avoid the generation of an unacceptable level of reverse IMD and limit a generation of reverse IMD to a minimized, predetermined acceptable IMD level, without using feedback of reverse IMD.

Reverse intermodulation occurs when energy is coupled from one transmitter into the antenna associated with another co-located transmitter creating a simultaneous flow of reverse energy and forward energy associated with signals transmitted from these co-located transmitters. The coupled energy mixes, using the nonlinearity of a power amplifier within the output network of the transmitter, to create an infinite number of intermodulation products which can cause interference at a co-located receiver. These created intermodulation products have amplitudes that are a function of (a) the transmitted forward wave, (b) the coupled reverse wave and (c) the nature of the power amplifier nonlinearity. However, power amplifier controller 160 operates to (1) minimize the impact of intermodulation products that are re-propagated to the collocated receivers and to (2) eliminate the ability of these re-propagated intermodulation products to create additional intermodulation products of sufficient level to preclude reception at corresponding receiver channel frequencies.

Power amplifier controller 160 initiates a second operating state of the power amplifier to trigger an increase in linearity of the at least one power amplifier. As a result, power amplifier controller 160 minimizes the interference of the reverse IMD signal and/or reduces the reverse IMD signal on the at least one receive channel that can be caused by and/or associated with the concurrent operation of the multiple transmitters. In one embodiment, power amplifier controller 160 initiates the second operating state when concurrent transmitter operation is being initiated, in order to avoid performance degradation. In this case, power amplifier controller 160 utilizes information stored within RFIC 132 which information associates operating channels and transmit power levels with a preferred operating state and corresponding IMD and/or reverse IMD performance levels to properly configure power amplifier 208, 228 to provide minimized receiver desensitization.

In order to determine a proper configuration for power amplifier 208, 228, power amplifier controller 160 retrieves, from a storage device of the RFIC, information that maps specific operating parameter values of the at least one power amplifier with pre-identified channel pairs having associated transmit power levels. These specific operating parameter values cause the power amplifier to provide a pre-specified linearity increase that reduces an impact of reverse IMD for that identified pairing of transmit channels. In one embodiment, power amplifier controller 160 identifies frequency values and transmit power levels associated with a first transmit channel and a second transmit channel of the RFIC. The first transmit channel and the second transmit channel respectively correspond to the first transmitter and the second transmitter and collectively provide an active transmitter channel pair. Power amplifier controller 160 determines whether frequency values and transmit power levels associated with the first transmit channel and the second transmit channel matches stored information about a transmit channel pair from among one of the pre-identified transmit channel pairs. In response to the frequency values and transmit power levels associated with the active transmit channel pair matching stored information about a transmit channel pair, power amplifier controller 160 retrieves the stored parameter values associated with the pre-identified transmit channel pair and power amplifier controller 160 re-configures the at least one power amplifier using the stored parameter values in order to change the operating state of the at least one power amplifier and increase the power amplifier linearity.

In another embodiment, power amplifier controller 160 dynamically measures reverse IMD using reverse IMD feedback measurement component 335 associated with the at least one power amplifier. Power amplifier controller 160 determines whether the measured reverse IMD is within a threshold range of an unacceptable level of reverse IMD. In response to the measured reverse IMD being within the threshold range of the unacceptable level of reverse IMD, power amplifier controller 160 re-configures the at least one power amplifier using stored parameter values in order to increase the power amplifier linearity and provide a reverse IMD performance enhancement associated with the second state.

According to one aspect, power amplifier controller 160 re-configures the at least one power amplifier by providing pre-determined levels of adjustment to at least one of (a) a power amplifier bias, (b) a power amplifier supply voltage and (c) a power amplifier load match triggered by changes in at least one of an input impedance and output impedance of the power amplifier. Power amplifier controller 160 provides at least one pre-determined level of adjustment to a corresponding power amplifier operating parameter in order to provide a corresponding pre-determined adjustment of power amplifier linearity of a reverse power amplifier path. The pre-determined adjustment of power amplifier linearity in the reverse power amplifier path provides a corresponding pre-determined performance improvement in at least one of: (a) voice quality; (b) data quality; and (c) throughput. In particular, the corresponding pre-determined performance improvement is caused by changing the power amplifier linearity in the reverse power amplifier path to minimize a desensitization impact of reverse IMD to a corresponding or co-located receiver channel.

In one embodiment, in order to determine whether to switch an operating state of power amplifier 208, 228, power amplifier controller 160 determines whether the concurrent operation of multiple transmitters result in a reverse IMD frequency occurring in at least one receive channel. Specifically, power amplifier controller 160 determines whether the reverse IMD frequency occurs in at least one receive channel and results from a sum of integer multiples of the first transmit signal frequency and the second transmit signal frequency utilized by the concurrently operating transmitters, while the at least one power amplifier operates in the first operating state. In addition, power amplifier controller 160 determines whether the concurrent operation of multiple transmitters results in reverse IMD having a level of desensitization that exceeds a pre-established threshold level of desensitization. In one particular implementation, power amplifier controller 160 determines whether a first transmit signal power level and a second transmit signal power level of the concurrently operating transmitters result in the reverse IMD that exceeds the threshold level of desensitization and which results from a linear function of the first and second transmit signal power levels. In response to the threshold level of desensitization caused by the reverse IMD occurring in the at least one receive channel while the at least one power amplifier operates in the first state, power amplifier controller 160 initiates the switch to a second state by adjusting at least one parameter of the at least one power amplifier to increase the linearity of the at least one power amplifier and provide an improved reverse IMD performance associated with pre-established IMD values. According to one embodiment, the pre-established IMD values comprise at least one of: (a) a first level of reverse IMD corresponding to a first receiver of the multiple receivers; (b) a second level of reverse IMD corresponding to a second receiver of the multiple receivers; (c) a maximum IMD at the at least one power amplifier; and (d) a maximum IMD at an antenna coupled to the RFIC.

In one embodiment, power amplifier controller 160 controls a level of power adjustment used to increase power amplifier linearity and reduce an interference impact of reverse IMD by implementing a maximum power reduction procedure which places a limit on the increase in power that can be provided to increase power amplifier linearity. Furthermore, power amplifier controller 160 provides a level power adjustment to minimize an impact of interfering signals at a receiver while increasing power amplifier linearity and reducing an interference impact of reverse IMD by implementing receiver interference cancellation. In addition, power amplifier controller 160 provides a minimal increase in current drain, while adjusting power amplifier parameter values to increase power amplifier linearity, by applying a power adjustment associated with envelope tracking (ET) and gain mapping.

Power amplifier controller 160 selectively triggers an increase in power amplifier linearity to prevent an occurrence of the threshold level of interference at the at least one receive channel. In particular, power amplifier controller 160 selectively triggers the increase in power amplifier linearity in order to minimize an increase in power consumption that accompanies an increase in PA linearity.

In one embodiment, power amplifier controller 160 identifies frequency values and transmit power levels associated with a first transmit channel and a second transmit channel of concurrently operating transmitters 206 and 226 (FIG. 2) which are connected to first power amplifier 208 and second power amplifier 228 of RFIC 132. Based on the identified frequency values and transmit power levels, power amplifier controller 160 re-configures first power amplifier 208 and second power amplifier 228 using the stored parameter values (from table 400, FIG. 4) in order to change the respective operating states of the power amplifiers and increase power amplifier linearity.

In another embodiment, power amplifier controller 160 dynamically measures reverse IMD associated with the power amplifiers using a feedback mechanism provided by reverse IMD measurement module 335. Power amplifier controller 160 determines whether the measured reverse IMD is within an acceptable range of reverse IMD. In response to the measured reverse IMD being within the unacceptable range of reverse IMD, power amplifier controller 160 re-configures the at least one power amplifier using the stored parameter values in order to increase the power amplifier linearity and provide a reverse IMD performance enhancement associated with the second state.

Power amplifier controller 160 re-configures the respective power amplifiers by providing pre-determined levels of adjustment to at least one of: (a) a power amplifier bias, (b) a power amplifier supply voltage, and (c) a power amplifier load match triggered by changes in at least one of an input impedance and output impedance of the power amplifier. In particular, power amplifier controller 160 reconfigures first power amplifier 208 by making specific supply voltage adjustments at supply voltage circuit 304 and sending a corresponding supply voltage signal via first supply voltage line 314 to first power amplifier 208. Power amplifier controller 160 makes power amplifier bias adjustments at power amplifier bias circuit 306, and provides a voltage bias signal via first bias line 312 to first power amplifier 208. In addition, power amplifier controller 160 makes power amplifier load match adjustments to load match circuit 308, and provides a load match signal via first load match line 316 to first power amplifier 208. In a manner similar to the re-configuration of first power amplifier 208, power amplifier controller 160 can and/or may also reconfigure second power amplifier 228.

Those of ordinary skill in the art will appreciate that the hardware components and basic configurations depicted in FIGS. 1, 2 and 3 may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention.

Figure 4:
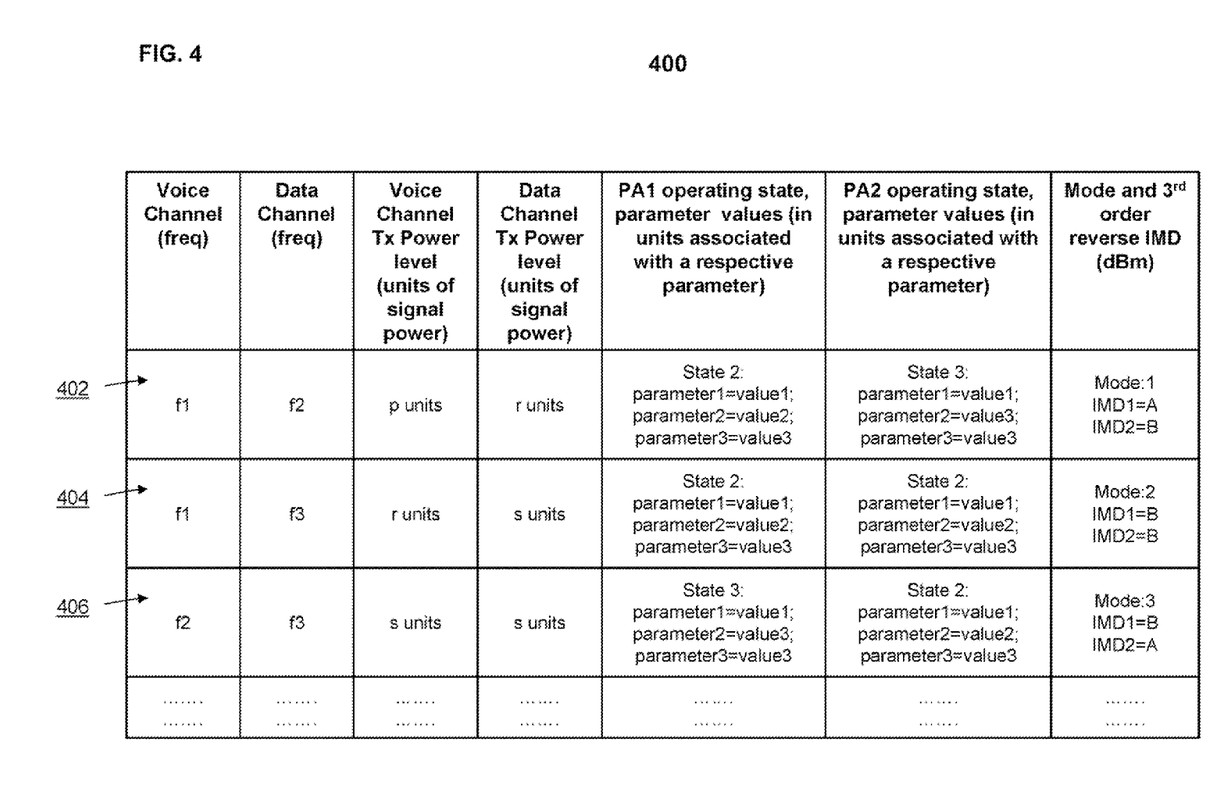
FIG. 4 is a table of frequency values and transmit power levels associated with an active transmit channel pair as well as corresponding parameter values and acceptable reverse IMD levels associated with a pair of power amplifiers, according to one embodiment.

FIG. 4 is a table of frequency values and transmit power levels associated with an active transmit channel pair as well as corresponding parameter values and acceptable reverse IMD levels associated with a pair of power amplifiers, according to one embodiment. Table 400 provides, in a first table column, first frequency values for a voice channel and, in a second table column, second frequency values for a data channel. The voice channel and the data channel represent an active transmit channel pair. In addition, table 400 provides, in a third table column, first transmit power levels for the voice channel and, in a fourth table column, second transmit power levels for the data channel. In addition, table 400 provides, in a fifth column, a pre-established preferred operating state and parameter values for a power amplifier (PA1) corresponding to the voice channel. In a sixth column, table 400 provides a pre-established preferred operating state and parameter values for a power amplifier (PA2) corresponding to the data channel. In a seventh column, table 400 provides an expected and acceptable range of reverse IMD generated by each of the power amplifiers, corresponding to the preferred operating state. The acceptable range of third order reverse IMD generated by each of the power amplifiers is expected to occur when (a) transmitters associated with the voice and data channels are concurrently operating; and (b) power amplifier 160 configures first power amplifier 208 and second power amplifier 228 for operation in respective preferred states using corresponding parameter values provided in the fifth and sixth columns of table 400.

When wireless communication device 100 operating in a simultaneous transmitter mode produces a reverse IMD product which falls on one or both receive channels, power amplifier controller 160 adjusts at least one operating parameter value to minimize reverse IMD and increase PA linearity in order to achieve a necessary voice and/or data quality and throughput. Table 400 indicates that at least one pre-established parameter value is used to configure a particular operating state of a corresponding power amplifier. In particular, table 400 refers, in the fifth and sixth columns, to "parameter 1", "parameter 2" and "parameter 3". In one embodiment, parameter 1, parameter 2 and parameter 3 represent power amplifier bias, power amplifier supply voltage, and power amplifier load match. It should be appreciated that the use of three different and specific operating parameters is provided as an example for illustration purposes and is not intended to limit the disclosure.

Referring specifically to table 400, first row 402 of table 400 shows a first signal frequency "f1" for a voice channel and a second signal frequency "f2" for a data channel. First row 402 also provides a first signal power level, "p" units of signal power, corresponding to the voice channel and a second signal power level, "r" units of signal power, corresponding to the data channel. The channel frequencies and transmit power levels are values that represent values for a particular transceiver IC configuration and/or simultaneous transmission mode.

During active device operation, in one embodiment, power amplifier controller 160 identifies frequency values and transmit power levels associated with a first transmit channel and a second transmit channel of the active transmitter channel pair of the RFIC. In another embodiment, power amplifier controller 160 identifies the active operating mode and measures the reverse IMD levels generated by the pair of power amplifiers to determine whether the measured reverse IMD levels match acceptable reverse IMD levels for the active operating mode provided within table 400. In response to the measured reverse IMD levels not matching acceptable reverse IMD levels associated with the active operating mode, power amplifier controller 160 retrieves the stored parameter values associated with a corresponding transmit channel pair and re-configures at least one power amplifier using the stored parameter values in order to change the operating state of the at least one power amplifier and increase the power amplifier linearity.

However, referring to the embodiment in which power amplifier controller 160 identifies frequency values and transmit power levels associated with the transmit channel pair, power amplifier controller 160 determines whether frequency values and transmit power levels associated with a first transmit channel and a second transmit channel matches stored information from table 400 about a transmit channel pair. In response to the frequency values and transmit power levels associated with the active transmit channel pair matching stored information about a transmit channel pair, power amplifier controller 160 retrieves the stored parameter values associated with the pre-identified transmit channel pair and re-configures the at least one power amplifier using the stored parameter values in order to change the operating state of the at least one power amplifier and increase the power amplifier linearity.

For example, if power amplifier controller 160 determines that the frequency values and transmit power levels associated with the active transmit channel pair match the frequency values and transmit power levels provided in first row 402, power amplifier controller 160, using operating parameter information in the fifth column, configures first power amplifier 208, corresponding to the voice channel, to a second operating state. In particular, power amplifier controller 160 assigns to the voice channel values of: (a) "value1" units associated with parameter 1 to "parameter 1"; (b) "value2" units associated with parameter 2 to "parameter 2"; and (c) "value3" units associated with parameter 3 to "parameter 3". In addition, power amplifier controller 160, using operating parameter information in the sixth column, configures second power amplifier 228, corresponding to the data channel, to a third operating state. In particular, power amplifier controller 160 assigns to the data channel values of: (a) "value1" units associated with parameter 1 to "parameter 1"; (b) "value3" units associated with parameter 2 to "parameter 2"; and (c) "value3" units associated with parameter 3 to "parameter 3". The seventh row of table 400 indicates that the expected and acceptable ranges of third order reverse IMD generated by each of the power amplifiers, corresponding to the preferred operating state(s), are level A at the receiver of the voice channel and level B at the receiver of the data channel.

Second row 404 provides configuration data for a second simultaneous transmission mode. Third row 406 provides configuration data for a third simultaneous transmission mode. The configuration data provided in second row 404 and third row 406 can be utilized for corresponding transmission modes in a manner similar to the manner in which configuration data is used for the first simultaneous transmission mode.

Figure 5:
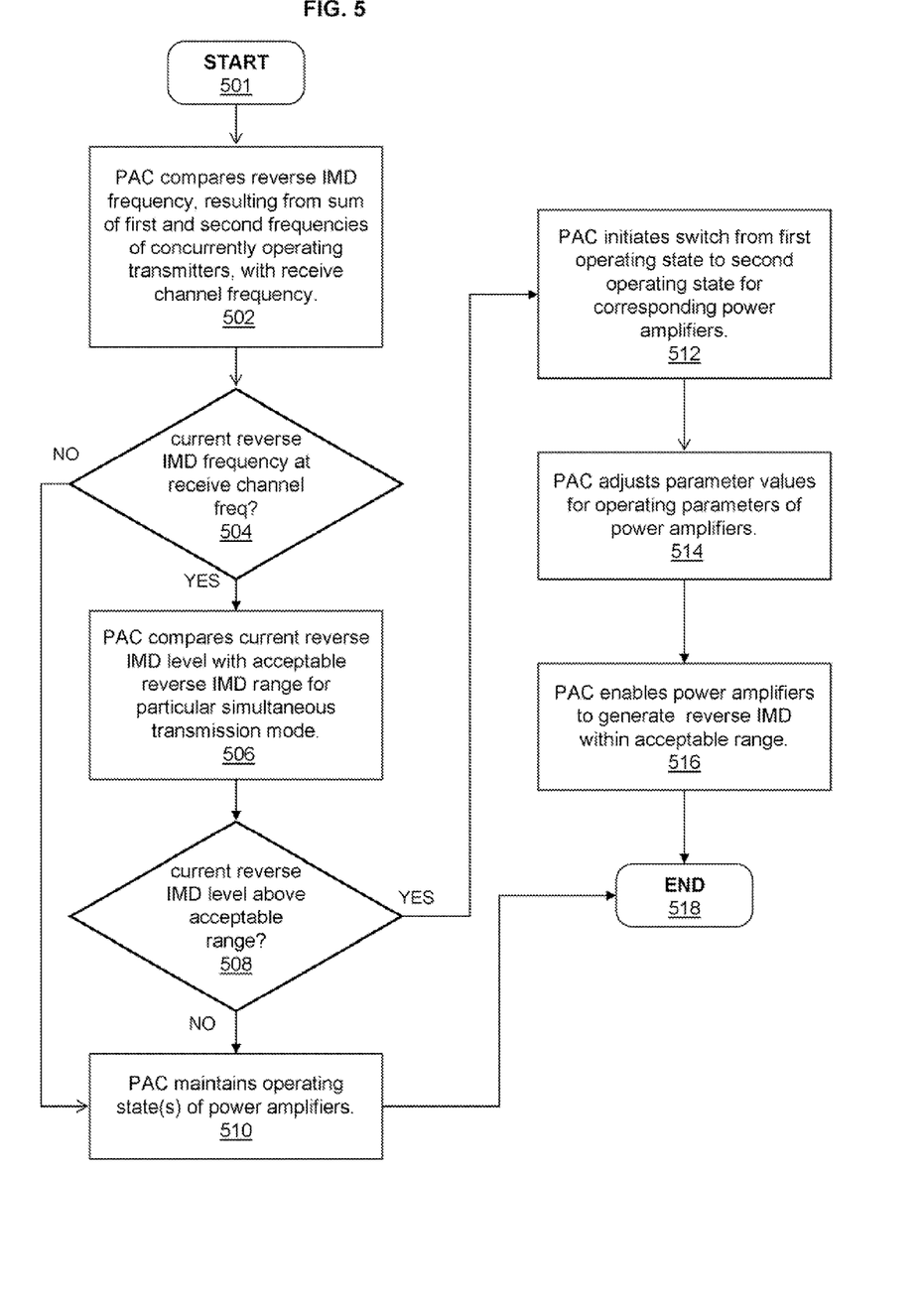
FIG. 5 is a flow chart illustrating one embodiment of a method for mitigating receiver desensitization caused by reverse intermodulation distortion (IMD) generated by a power amplifier in a wireless communication device, according to one embodiment.
Figure 6:
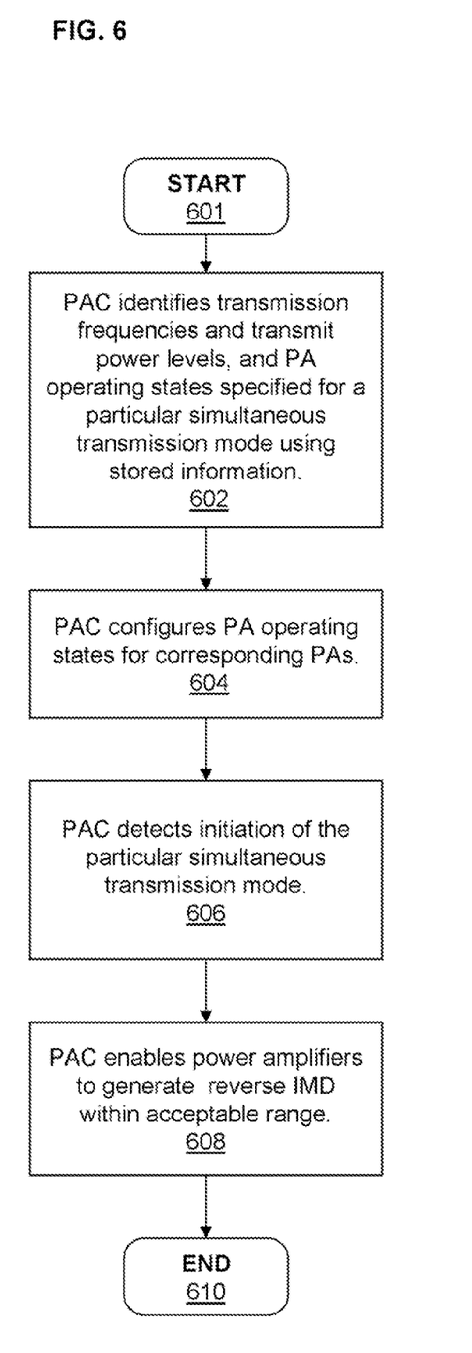
FIG. 6 is a flow chart illustrating another method for mitigating receiver desensitization caused by reverse intermodulation distortion generated by a power amplifier in a wireless communication device, according to one embodiment.

FIGS. 5 and 6 are a flow charts illustrating different embodiment of the methods by which the above processes of the illustrative embodiments can be implemented. Specifically, FIG. 5 illustrates one embodiment of a method for mitigating receiver desensitization caused by reverse intermodulation distortion generated by a power amplifier in a wireless communication device, according to one embodiment. Although the method illustrated by FIGS. 5 and 6 may be described with reference to components and functionality illustrated by and described in reference to FIGS. 1-4, it should be understood that this is merely for convenience and alternative components and/or configurations thereof can be employed when implementing the method. Certain portions of the methods may be completed by PAC utility 167 executing on one or more processors (processor 105 or DSP 128) within wireless communication device 100 (FIG. 1), or a processing unit or controller of RFIC 132 (FIGS. 1 and 2). The executed processes then control specific operations of or on RFIC 132. For simplicity is describing the methods, all method processes are described from the perspective of RFIC 132 and specifically power amplifier controller 160.

The method of FIG. 5 begins at initiator block 501 and proceeds to block 502 at which power amplifier controller 160 compares (a) a reverse IMD frequency, resulting from a sum of first and second transmit frequencies of concurrently operating transmitters, and (b) a receive channel frequency. At decision block 504, power amplifier controller 160 determines whether current reverse IMD frequency is substantially a same frequency as a receive channel frequency. If at decision block 504, power amplifier controller 160 determines that the current reverse IMD frequency is not substantially the same frequency as the at least one receive channel frequency, power amplifier controller 160 maintains an operating state (s) of a corresponding power amplifier(s), as shown at block 510.

However, if at decision block 504, power amplifier controller 160 determines that the current reverse IMD frequency is substantially the same frequency as the at least one receive channel frequency, the process moves to block 506 at which power amplifier controller 160 compares a current reverse IMD level generated by at least one power amplifier with an acceptable reverse IMD level or range for a particular simultaneous transmission mode. In particular, power amplifier controller 160 utilizes information from a stored data structure, such as table 400, and/or measurements of reverse IMD to make the comparison. At decision block 508, power amplifier controller 160 determines, utilizing information in the stored data structure, whether the current reverse IMD level is above the acceptable range for reverse IMD. If at decision block 508, power amplifier controller 160 determines that the current reverse IMD level is above the acceptable range for reverse IMD, power amplifier controller 160 initiates a switch from a first operating state to a second operating state for a corresponding power amplifier(s), as shown at block 512. In particular, power amplifier controller 160 switches an operating state for a respective power amplifier by providing, utilizing information in the stored data structure, pre-determined levels of adjustment to at least one of (a) a power amplifier bias, (b) a power amplifier supply voltage and (c) a power amplifier load match. However, if at decision block 508, power amplifier controller 160 determines that the current reverse IMD level is not above the acceptable range for reverse IMD, power amplifier controller 160 maintains an operating state(s) of a corresponding power amplifier(s), as shown at block 510. From block 512, the process proceeds to block 514 at which power amplifier controller 160 adjusts parameter values for operating parameters of the corresponding power amplifiers. At block 516, power amplifier controller 160 enables the power amplifiers (e.g., first power amplifier 208 and second power amplifier 228) with modified operating states to generate a reverse IMD within an acceptable range. The process ends at block 518.

FIG. 6 illustrates another method for mitigating receiver desensitization caused by reverse intermodulation distortion generated by a power amplifier in a wireless communication device, according to one embodiment. The method of FIG. 6 begins at initiator block 601 and proceeds to block 602 at which power amplifier controller 160, utilizing information in a stored data structure such as table 400, identifies, for a particular simultaneous transmission mode, transmission signal frequencies and power levels specified for a pair of co-located transmitters, and power amplifier operating states specified for a pair of power amplifiers, using stored information. At block 604, power amplifier controller 160 configures operating states for the corresponding power amplifiers (e.g., power amplifiers 208 and 228). At block 606, power amplifier controller 160 detects initiation of the particular simultaneous transmission mode. At block 608, power amplifier controller 160 enables power amplifiers 208 and 228 to generate reverse IMD within an acceptable range during concurrent operation of first power amplifier 208 and second power amplifier 228. The process ends at block 610.

The flowcharts and block diagrams in the various figures presented and described herein illustrate the architecture, functionality, and operation of possible implementations of systems, methods and computer program products according to various embodiments of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Thus, while the method processes are described and illustrated in a particular sequence, use of a specific sequence of processes is not meant to imply any limitations on the disclosure. Changes may be made with regards to the sequence of processes without departing from the spirit or scope of the present disclosure. Use of a particular sequence is therefore, not to be taken in a limiting sense, and the scope of the present disclosure extends to the appended claims and equivalents thereof.

In some implementations, certain processes of the methods are combined, performed simultaneously or in a different order, or perhaps omitted, without deviating from the spirit and scope of the disclosure. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method for reducing inter-modulation distortion (IMD) in a radio frequency integrated circuit (RFIC) having multiple transmitters, the method comprising:
   determining whether at least one power amplifier operating in a first operating state generates a reverse inter-modulation distortion (IMD) signal that can interfere with at least one receive channel from among a first receive channel and a second receive channel due to a concurrent operation of multiple transmitters; and
   in response to determining that the at least one power amplifier generates the reverse IMD signal when in the first operating state, initiating a second operating state of the power amplifier to trigger an increase in linearity of the at least one power amplifier and consequently reduce the reverse IMD signal on the at least one receive channel caused by the concurrent operation of the multiple transmitters.

2. The method of claim 1, wherein said initiating a second operating state of the power amplifier further comprises:
   in order to provide a corresponding pre-determined adjustment of power amplifier linearity of a reverse power amplifier path, providing pre-determined levels of adjustment to at least one of (a) a power amplifier bias signal, (b) a power amplifier supply voltage and (c) a power amplifier load match triggered by changes in at least one of an input impedance and an output impedance of the power amplifier.

3. The method of claim 1, further comprising:
   detecting that the concurrent operation of multiple transmitters utilizes a first transmit signal frequency and a second transmit signal frequency;
   wherein said determining further comprises determining that an IMD frequency resulting from a sum of integer multiples of the first transmit signal frequency and a second transmit signal frequency occurs in at least one receive channel: and
   in response to determining that the IMD frequency occurs in the at least one receive channel, adjusting at least one parameter of the at least one power amplifier to increase the linearity of the at least one power amplifier and provide an improved reverse IMD performance.

4. The method of claim 1, further comprising:
   detecting that the concurrent operation of multiple transmitters utilizes (a) a first transmit signal power level and a second transmit signal power level and (b) a first transmit signal frequency and a second transmit signal frequency that result in an IMD frequency occurring in at least one receive channel, wherein the IMD frequency is a sum of integer multiples of the first transmit signal frequency and the second transmit signal frequency;

wherein said determining further comprises determining that a desensitization of reverse IMD, resulting from a linear function of the first and second transmit signal power levels, exceeds a threshold level of desensitization; and said initiating a second state of the at least one power amplifier further comprises:
in response to the threshold level of desensitization caused by the reverse IMD occurring in the at least one receive channel while the at least one power amplifier operates in the first state, adjusting at least one parameter of the at least one power amplifier to increase the linearity of the at least one power amplifier and provide an improved reverse IMD performance associated with pre-established IMD levels comprising at least one of: (a) a first level of reverse IMD corresponding to a first receiver of the multiple receivers; (b) a second level of reverse IMD corresponding to a second receiver of the multiple receivers; (c) a maximum reverse IMD at the at least one power amplifier; and (d) a maximum reverse IMD at an antenna coupled to the RFIC.

5. The method of claim 1, wherein said determining further comprises:
measuring reverse IMD using a feedback mechanism associated with the at least one power amplifier;
determining whether the measured reverse IMD is within a threshold range of an unacceptable level of reverse IMD; and
in response to the measured reverse IMD being within the threshold range of the unacceptable level of reverse IMD, re-configuring the at least one power amplifier using stored parameter values in order to increase the power amplifier linearity and provide a reverse IMD performance enhancement associated with the second operating state.

6. The method of claim 1, wherein said initiating a second operating state of the power amplifier further comprises:
retrieving, from a storage device of the RFIC, information mapping specific operating parameter values of the at least one power amplifier with pre-identified channel pairs having associated transmit power levels, wherein the specific operating parameter values cause the power amplifier to provide a pre-specified linearity increase that reduces an impact of reverse IMD for that pairing of transmit channels;
identifying frequency values and transmit power levels associated with a first transmit channel and a second transmit channel of the RFIC, wherein the first transmit channel and the second transmit channel respectively correspond to the first transmitter and the second transmitter and collectively provide an active transmit channel pair;
determining whether frequency values and transmit power levels associated with the active transmit channel pair matches stored information about a transmit channel pair;
in response to the frequency values and transmit power levels associated with the active transmit channel pair matching stored information about a transmit channel pair: retrieving the stored parameter values associated with the pre-identified transmit channel pair; and re-configuring the at least one power amplifier using the stored parameter values in order to change the operating state of the at least one power amplifier and increase the power amplifier linearity.

7. The method of claim 1, further comprising:
providing an increase in power amplifier linearity and a reduction of reverse IMD by implementing at least one of: (a) a maximum power reduction; and (b) a receiver interference cancellation.

8. The method of claim 1, further comprising:
providing a minimal increase in current drain while adjusting power amplifier parameter values to increase power amplifier linearity, wherein the minimal increase is provided by applying a power adjustment associated with envelope tracking (ET) and gain mapping.

9. A radio frequency integrated circuit (RFIC) comprising:
a transceiver having: two concurrently operating transmitters with a first transmitter for voice communication and a second transmitter for data communication; and at least two receivers;
a power amplifier capable of operating in a plurality of operating states, including a first operating state and a second operating state; and
a power amplifier controller that:
determines whether at least one power amplifier operating in a first operating state generates a reverse intermodulation distortion (IMD) signal that can interfere with at least one receive channel from among a first receive channel and a second receive channel due to a concurrent operation of both the first transmitter and the second transmitter; and
in response to determining that the at least one power amplifier generates the reverse IMD signal when in the first operating state, initiates a second operating state of the power amplifier to trigger an increase in linearity of the at least one power amplifier and consequently reduce the reverse IMD signal on the at least one receive channel caused by the concurrent operation of the first transmitter and the second transmitter.

10. The RFIC of claim 9, wherein the amplifier controller:
provides pre-determined levels of adjustment to at least one of (a) a power amplifier bias signal, (b) a power amplifier supply voltage and (c) a power amplifier load match triggered by changes in at least one of an input impedance and output impedance of the power amplifier, in order to provide a corresponding pre-determined adjustment of power amplifier linearity of a reverse power amplifier path.

11. The RFIC of claim 9, wherein the power amplifier controller:
detects that the concurrent operation of multiple transmitters utilizes a first transmit signal frequency and a second transmit signal frequency;
determines that an IMD frequency resulting from a sum of integer multiples of the first transmit signal frequency and a second transmit signal frequency occurs in at least one receive channel: and
in response to said determining that the IMD frequency occurs in the at least one receive channel, adjusts at least one parameter of the at least one power amplifier to increase the linearity of the at least one power amplifier and provide an improved reverse IMD performance.

12. The RFIC of claim 9, wherein the power amplifier controller:
detects that the concurrent operation of multiple transmitters utilizes (a) a first transmit signal frequency and a second transmit signal frequency that result in an IMD frequency occurring in at least one receive channel, wherein the IMD frequency is a sum of integer multiples of the first transmit signal frequency and the second transmit signal frequency, and (b) a first transmit signal power level and a second transmit signal power level;

determines that a desensitization of reverse IMD, resulting from a linear function of the first and second transmit signal power levels, exceeds a threshold level of desensitization; and in response to the threshold level of desensitization caused by the reverse IMD occurring in the at least one receive channel while the at least one power amplifier operates in the first state, performs said initiating of a second state by adjusting at least one parameter of the at least one power amplifier to increase the linearity of the at least one power amplifier and provide an improved reverse IMD performance associated with pre-established IMD levels comprising at least one of: (a) a first level of reverse IMD corresponding to a first receiver of the multiple receivers; (b) a second level of reverse IMD corresponding to a second receiver of the multiple receivers; (c) a maximum reverse IMD at the at least one power amplifier; and (d) a maximum reverse IMD at an antenna coupled to the RFIC.

13. The RFIC of claim 9, wherein the power amplifier controller:

measures reverse IMD using a feedback mechanism associated with the at least one power amplifier;

determines whether the measured reverse IMD is within a threshold range of an unacceptable level of reverse IMD; and in response to the measured reverse IMD being within the threshold range of the unacceptable level of reverse IMD, re-configures the at least one power amplifier using stored parameter values in order to increase the power amplifier linearity and provide a reverse IMD performance enhancement associated with the second state.

14. The RFIC of claim 9, wherein the power amplifier controller:

retrieves, from a storage device of the RFIC, information mapping specific operating parameter values of the at least one power amplifier with pre-identified channel pairs having associated transmit power levels, wherein the specific operating parameter values cause the power amplifier to provide a pre-specified linearity increase that reduces an impact of reverse IMD for that pairing of transmit channels;

identifies frequency values and transmit power levels associated with a first transmit channel and a second transmit channel of the RFIC, wherein the first transmit channel and the second transmit channel respectively correspond to the first transmitter and the second transmitter and collectively provide an active transmitter channel pair;

determines whether frequency values and transmit power levels associated with a first transmit channel and a second transmit channel matches stored information about a transmit channel pair; and in response to the frequency values and transmit power levels associated with the active transmit channel pair matching stored information about a transmit channel pair: retrieves the stored parameter values associated with the pre-identified transmit channel pair; and re-configures the at least one power amplifier using the stored parameter values in order to change the operating state of the at least one power amplifier and increase the power amplifier linearity.

15. The RFIC of claim 9, wherein the power amplifier controller:

provides an increase in power amplifier linearity and a reduction of reverse IMD by implementing at least one of: (a) a maximum power reduction; and (b) a receiver interference cancellation.

16. The RFIC of claim 9, wherein the power amplifier controller provides a minimal increase in current drain while adjusting power amplifier parameter values to increase power amplifier linearity, wherein the minimal increase is provided by applying a power adjustment associated with envelope tracking (ET) and gain mapping.

17. A wireless communication device having a radio frequency integrated circuit (RFIC) coupled to at least one antenna and which includes:

a transceiver having: two concurrently operating transmitters with a first transmitter for voice communication and a second transmitter for data communication; and at least two receivers;

a power amplifier capable of operating in a plurality of operating states, including a first operating state and a second operating state; and a power amplifier controller that:

determines whether at least one power amplifier operating in a first operating state generates a reverse intermodulation distortion (IMD) signal that can interfere with at least one receive channel from among a first receive channel and a second receive channel due to a concurrent operation of both the first transmitter and the second transmitter; and in response to determining that the at least one power amplifier generates the reverse IMD signal when in the first operating state, initiates a second operating state of the power amplifier to trigger an increase in linearity of the at least one power amplifier and consequently reduce the reverse IMD signal on the at least one receive channel caused by the concurrent operation of the first transmitter and the second transmitter.

18. The wireless communication device of claim 17, wherein the power amplifier controller:

provides pre-determined levels of adjustment to at least one of (a) a power amplifier bias signal, (b) a power amplifier supply voltage and (c) a power amplifier load match triggered by changes in at least one of an input impedance and output impedance of the power amplifier, in order to provide a corresponding pre-determined adjustment of power amplifier linearity of a reverse power amplifier path;

wherein the power amplifier: provides an increase in power amplifier linearity and a reduction of reverse IMD by implementing at least one of: (a) a maximum power reduction; and (b) a receiver interference cancellation; and provides a minimal increase in current drain while adjusting power amplifier parameter values to increase power amplifier linearity, wherein the minimal increase is provided by applying a power adjustment associated with envelope tracking (ET) and gain mapping.

19. The RFIC of claim 17, wherein the power amplifier controller:

detects that the concurrent operation of multiple transmitters utilizes (a) a first transmit signal frequency and a second transmit signal frequency that result in an IMD frequency occurring in at least one receive channel, wherein the IMD frequency is a sum of integer multiples of the first transmit signal frequency and the second transmit signal frequency, and (b) a first transmit signal power level and a second transmit signal power level;

determines that a desensitization of reverse IMD, resulting from a linear function of the first and second transmit signal power levels, exceeds a threshold level of desensitization;

in response to the threshold level of desensitization caused by the reverse IMD occurring in the at least one receive channel while the at least one power amplifier operates in the first state, performs said initiating of a second state by adjusting at least one parameter of the at least one power amplifier to increase the linearity of the at least one power amplifier and provide an improved reverse IMD performance associated with pre-established IMD levels comprising at least one of: (a) a first level of reverse IMD corresponding to a first receiver of the multiple receivers; (b) a second level of reverse IMD corresponding to a second receiver of the multiple receivers; (c) a maximum reverse IMD at the at least one power amplifier; and (d) a maximum reverse IMD at an antenna coupled to the RFIC;

wherein the power amplifier controller determines whether a pre-established threshold level of desensitization caused by the reverse IMD occurs in at least one receive channel by:

retrieving, from a storage device of the RFIC, information mapping specific operating parameter values of the at least one power amplifier transmit with pre-identified channel pairs having associated transmit power levels, wherein the specific operating parameter values cause the power amplifier to provide a pre-specified linearity increase that reduces an impact of reverse IMD for that pairing of transmit channels;

identifying frequency values and transmit power levels associated with a first transmit channel and a second transmit channel of the RFIC, wherein the first transmit channel and the second transmit channel respectively correspond to the first transmitter and the second transmitter and collectively provide an active transmitter channel pair;

determining whether frequency values and transmit power levels associated with a first transmit channel and a second transmit channel matches stored information about a transmit channel pair; and in response to the frequency values and transmit power levels associated with the active transmit channel pair matching stored information about a transmit channel pair: retrieving the stored parameter values associated with the pre-identified transmit channel pair; and re-configuring the at least one power amplifier using the stored parameter values in order to change the operating state of the at least one power amplifier and increase the power amplifier linearity.

20. The RFIC of claim 17, wherein the power amplifier controller:

measures reverse IMD using a feedback mechanism associated with the at least one power amplifier;

determines whether the measured reverse IMD is within a threshold range of an unacceptable level of reverse IMD; and in response to the measured reverse IMD being within the threshold range of the unacceptable level of reverse IMD, re-configures the at least one power amplifier using stored parameter values in order to increase the power amplifier linearity and provide a reverse IMD performance enhancement associated with the second state.

* * * * *